United States Patent [19]
Holte-Rost et al.

[11] Patent Number: 6,101,327
[45] Date of Patent: Aug. 8, 2000

[54] METHOD OF SYNCHRONIZATION ALLOWING STATE TRANSFER

[75] Inventors: Anna Holte-Rost, Bandhagen; Robert Fuchs, Uppsala; Ulf Markström, Stockholm, all of Sweden

[73] Assignee: Telefonaktiebolaget LM Ericsson, Stockholm, Sweden

[21] Appl. No.: 08/849,334

[22] PCT Filed: Dec. 4, 1995

[86] PCT No.: PCT/SE95/01452

§ 371 Date: Jun. 2, 1997

§ 102(e) Date: Jun. 2, 1997

[87] PCT Pub. No.: WO96/18146

PCT Pub. Date: Jun. 13, 1996

[30] Foreign Application Priority Data

Dec. 9, 1994 [SE] Sweden ................................. 9404297
Sep. 27, 1995 [SE] Sweden ................................. 9503339

[51] Int. Cl.[7] ................................................ G06F 9/445
[52] U.S. Cl. .............................................. 395/712; 370/469
[58] Field of Search ......................... 395/712; 370/469; 707/101; 709/305, 221; 714/25

[56] References Cited

U.S. PATENT DOCUMENTS

| | | | |
|---|---|---|---|
| 5,155,837 | 10/1992 | Liu et al. ................................. | 709/221 |
| 5,155,847 | 10/1992 | Kirouac et al. .......................... | 709/221 |
| 5,175,828 | 12/1992 | Hall et al. ................................ | 709/305 |
| 5,185,742 | 2/1993 | Bales et al. .............................. | 370/469 |
| 5,212,787 | 5/1993 | Baker et al. ............................. | 707/101 |
| 5,339,430 | 8/1994 | Lundin et al. ........................... | 709/305 |
| 5,410,703 | 4/1995 | Nilsson et al. ........................... | 714/11 |
| 5,606,659 | 2/1997 | Måløy ...................................... | 714/25 |
| 5,654,901 | 8/1997 | Boman .................................... | 395/712 |

OTHER PUBLICATIONS

Co-Pending Application Nos. 08/849,335, 07/907,294, 08/836,814 Mar. 15, 2000.
Co-Pending Application Nos. 08/765,160 (Not Available) Mar. 15, 2000.

*Primary Examiner*—Tariq R. Hafiz
*Assistant Examiner*—Antony Nguyen-Ba
*Attorney, Agent, or Firm*—Burns, Doane, Swecker & Mathis, L.L.P.

[57] ABSTRACT

Replacement of software in an operating computer system, and in particular, synchronization of state transfer between processes within the old software to processes within the new software. The synchronization of state transfer between processes executing in the old and the new software includes the following steps: preparing the old static process within the old software for a forthcoming shutdown, activating it for the state transfer, preparing the new static process within the new software to take over, transferring all resource objects in the old static process to the new static process; ordering the old static process to remove all services, terminating the old static process; and committing the new static process to take over, indicating that the new static process is the sole owner of all the resource objects previously claimed from the old static process.

10 Claims, 8 Drawing Sheets

Calls for allocating/
deallocating resources

Prepare Shutdown

Calls for allocating/
deallocating resources

A new Resource Server is started

Calls for allocating/
deallocating resources

New Resource Server

Normal calls for allocating/
deallocating resources

"get a Resource"

Test calls for allocating/
deallocating resources

METHOD OF SYNCHRONIZATION ALLOWING STATE TRANSFER

TECHNICAL FIELD OF THE INVENTION

The present invention relates to the replacement of software in an operating computer system, and in particular, to the synchronization of state transfer between processes within an old software to processes within a new software.

BACKGROUND

One aspect of computer software is that it must be periodically updated with revisions, additions and/or deletions in order to continue to provide adequate functionality to the user, to optimize the software and to correct errors and discrepancies that arise throughout the life of the software. As new features are added to software, it is desirable to replace the old software with the new versions as early as possible in order to provide the user with the features of the new software.

In certain types of computing systems, such as stand-alone or batch processing systems, changing software from one version to another presents few obstacles. Typically, the computer system is merely shut down during a period of day when there is little activity and the maintenance personnel are readily available. The old software is then simply removed and replaced by the newer version of the software. Thereafter, the computing system is restarted and all future data processing is done with the new version of the software. This procedure, of course, assumes that the new software has been adequately tested and debugged on an off-line system to the point that the software personnel and the operational management are confident that it will adequately perform the functions for which it is intended without undue interruptions that require halting and then re-starting the entire computing system.

In other types of computing systems, such as modern stored program control (SPC) telecommunications exchange systems (commonly referred to in the industry simply as "switches"), neither the testing of new versions of software nor the changing of software in the system is as easy as in stand-alone or batch processing systems. For example, new versions of software cannot be effectively tested without being placed into actual operation processing calls. The software must be tested while in operation in order to determine whether the software will adequately function under live operating conditions and whether the new portions will properly interface with all of the other software blocks that form a part of an operational SPC switching system. In addition, telecommunications switching systems are virtually never out of operation. Ideally; these systems would run perpetually, without interruption because of the continuous need for communications services within a community. That is, there is a continuous flow of telecommunications traffic being processed through the system even at off hours of the day or night and any interruption in the operation of the switch results in a non desired disruption of the telecommunications traffic. Such a disruption could be extremely damaging to the system's operation and its effectiveness, as well as its acceptance among users or costumers of the system.

These real-time requirements of telecommunications exchange systems place severe constraints on both the testing of enhanced versions of the software, or portions thereof, containing new or improved functionality, as well as the substitution of software containing error corrections or "bug fixes" in the switch without disrupting existing telecommunications traffic being processed by the switch. Therefore, integrating new versions of software components or units into the system using the traditional "edit-compile-link-load-run" approach is not desirable.

Another problem associated with the replacement of software in a operating computer system, such as telecommunications switches, is the state transfer between processes within the old software to processes within the new software, and especially the synchronization thereof. A process uses or comprises resource objects, which are object types that handle information on a hardware resource or an internal data structure. In context of the present invention it shall be understood that state transfer is the transfer of the state of a resource object. The state for a resource object is characterized by being allocated or deallocated. The state transfer between processes within the old software to the new software is essential to the users or customers of the system, since the state of the resource objects can be used by and survive several transactions. The states of the processes change over time, which makes it impossible to in advance incorporate the states of these processes into the new version of software, and thus if it is going to survive it has to be transferred from the old to the new software during the replacement thereof. What is preferred is a method that provides the capability to modify or extend the software together with the state transfer between the old and the new version of software while the system is in operation, and without any need for downtime.

Attempts have been made to solve the problems associated with incorporating new software into operating computer systems. For example, some advanced on-line operational systems in use today that do not operate in stand-alone or batch fashion will solve the problem of replacing old software in a manner that clearly differs from the method used with stand-alone or batch systems. However, such systems still replace software manually, although more transparently than in stand-alone systems, by requiring that individual users or user groups actively select whether or not to process using the new or revised version of software. This option may be exercised by users by modifying the concatenation of software to be utilized by processes operating under their individual user-id. The option remains available to users during a fixed period of time, usually measured in weeks or months, in which time the software migrates up several levels in the concatenation structure after successfully operating at each prior level without any discrepancies. Upon reaching the top level of the concatenation, the software is declared "operational" and the older versions are no longer available to users of the system. Insertion of new software into the system, as well as its migration up the various levels, is controlled by a process of configuration management, a manual process of reporting, approval, tracking software versions at each level and implementing approved changes.

As with the methods used to update software on batch or stand-alone systems, there are well known drawbacks to incorporating new or modified software into a system in this fashion. It is largely a manual, labour intensive system that is complex and time consuming. It leaves the control over whether and in what cases the system will operate with certain new software to the users with no means of performing gradual, restricted, on-line use so that errors do not proliferate or immediately affect all ongoing operations. The method of controlling access to new or revised software is directly linked and limited to the individual user executing the software.

Further, this method does not provide any means for transferring states from the old to the new version of software. Thus, the state transfer from the old to the new software is lost, which of course could affect the users in a negative way.

Other attempts to solve at least some of the problems associated with updating software in operational computer systems have been made. For example, in U.S. application Ser. No. 07/907,294, to Telefonaktiebolaget L M Ericsson, there is disclosed a method for replacing software in an operating computer system. With this method it is possible to test and change software during actual operation of the telecommunications switch without disrupting ongoing telecommunications traffic through the system. This method, however, is not directed towards transferring states from the old to the new version of software. Even if this method recognizes the need for such a state transfer it does not describe any means for synchronizing the data transfer from the old to the new software.

Therefore, it would be highly useful within in the telecommunications industry to be able to test and change software, including state transfer of processes from the old to the new software, during actual operation of the telecommunications switch without disrupting ongoing traffic through the system. The present invention provides such a method.

SUMMARY

The dynamic behaviour of computing systems such as SPC telecommunications switching systems can essentially be described as a series of parallel, relatively independent transactions (also referred to a "threads" or "chain of events") wherein every transaction consists of a number of related activities. A transaction typically performs a job that is visible and functionally useful to the external user of the system. In a telecommunications switching system a typical transaction may be a call.

Online software replacement using the smooth change techniques with state transfer in accordance with the present invention uses transaction oriented software together with a memory capable of storing both old and new software versions at the same time. A smooth change which transfers states to a new version is accomplished by allowing ongoing transactions, i.e, "old traffic", to run to completion using the old software version. Transactions started after the software change has begun, i.e., "new traffic", will in a gradual and controlled way be run using the new software version. The processes containing the states which are to be transferred from the old to the new version of software are, at the beginning of the software change, in the control of the old software. By means of different synchronization signals the new software will be able to access the states of the processes in control of the old software on an "as needed basis", so as to finally become the owner of the processes containing the updated states, given that the testing of the new software proceeds without any disturbances.

Principal requirements satisfied by the smooth software change techniques with state transfer of the present invention include minimal or no user disturbance and a high level of system availability. Principal characteristics of the present invention include the facts that: (1) minimal or no disturbance is experienced by an individual user of the system during a transaction (e.g. call) because one and only one software version controls each specific transaction, i.e. the system uses either the old or the new software version from the start to the end of the transaction; (2) no unavailability is experienced by an individual user of the system because of the software change since both software versions are used in parallel during the change; and (3) no states of the processes within the old software are lost because of the controlled state transfer between the old and the new versions of software.

The states of the processes which have to be treated and transferred by the system can in this context be separated into two different classes: (1) dynamic processes which are created and used during a transaction and which are deleted after the transaction is completed; and (2) static processes which are used by and survive several transactions, for example in telecom systems, processes containing states about subscriber numbers connected to the system or short numbers used by certain subscribers.

A crucial problem associated with online software replacement where minimal disturbance is required is that the state of the old software version has to be transferred to the new software version. Since both the old and the new software are operating parallel during the software change there clearly is no need for transferring dynamic processes, i.e. the process will be completed in the software version in which it was started. However, to be able to control in which version of the software, for example a new call, will be executed a selection point has to be provided to direct the traffic to the appropriate version of software.

The present invention provides a mechanism to identify which software version is to be used during system upgrade. Besides normal traffic test traffic also has to be identified at the selection point and then be directed to the new version of software which has to be tested before it executes normal (live) traffic.

In another aspect, the method of the present invention also provides means to synchronize the state transfer of static processes within the old to the new version of software. The synchronization of state transfer between processes executing in the old and the new software according to the present invention comprises the following operations.

PrepareShutdown is the first operation on a static process declared in old software, i.e. the software to be replaced due to system upgrade. This operation prepares the application for a forthcoming termination of the software to be replaced. After receiving the PrepareShutdown signal the static process in the old software publishes or activates an application specific interface for the transfer of resource objects (states). A resource object is an object type whose main purpose is to handle information on a hardware resource or an internal data structure, i.e. with the transfer of a resource object the state of such information is transferred.

After completion of this first operation the static process for the application within the new software is started and the new static process is called with test traffic and gets necessary resources from the old static process through the interface for state transfer owned by the old static process. If the test traffic runs without disturbances on the new software normal traffic will be executed by the new version of software, but the interface for state transfer is still owned by the old static process.

If this normal traffic also proceeds without any disturbances a Takeover signal is applied to the static process within the new software. With this operation the new software will get the control of all remaining resources from the old static process through the interface for state transfer owned by the old static process.

Thereafter the operation CommitShutdown is applied to the old static process. The application then removes it's interface for state transfer published or activated with the operation prepare shutdown.

At last the operation CommitTakeover is applied to the new version of software. The new static process is informed that the new software is committed. Processes that are dependent on old software system parts are terminated.

If the new software does not function properly the upgrading procedure may be reversed. If the reversion is made before the operation TakeOver it is possible to carry out this reversion without any disturbances for the users. The reversion is carried out by applying the operation CommitTakeover to the old version of software instead of the new version of software.

BRIEF DESCRIPTION OF THE DRAWINGS

For a better understanding of the present invention and further objects and advantages thereof, reference can now be made to the following description, taken in conjunction with the accompanying drawings in which.

DETAILED DESCRIPTION

Figure 1:
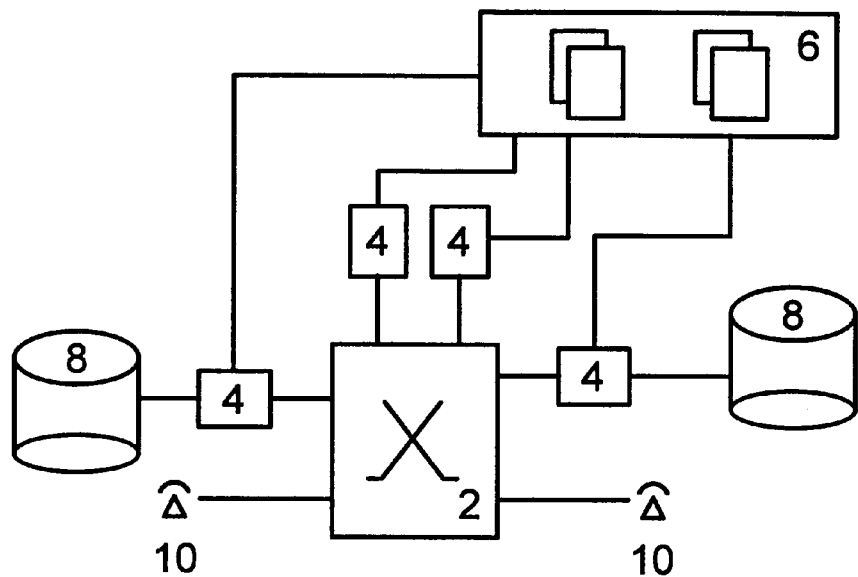
FIG. 1 shows a general telecommunications system.

The method according the present invention for replacement of old with new software, including state transfer, could, by way of an example, be used in a SPC telecommunications exchange system, hereinafter referred to as switch. A general telecommunication system, including a switch 2, distributed processors 4, application software 6, data bases 8 and telephones 10 is depicted in FIG. 1. The switch 2 is connected to one or more processors 4. The processors 4 are also connected to application software 6, and to databases 8, as known in the art.

Figure 2:
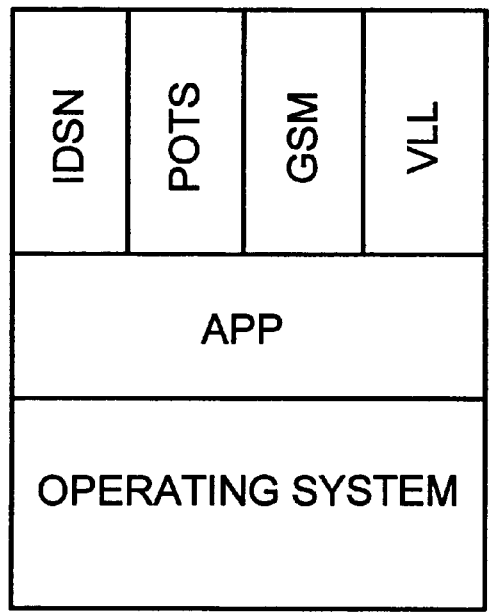
FIG. 2 shows the system architecture in a general telecommunications system.

To fully understand how the method according the present invention could be applied in such a system the system architecture, shown in FIG. 2, will now be described.

The most basic element in this structure is the operating system, in which the most basic functions are incorporated. The operating system according to the present invention comprises, for example, a function called System Upgrade. The System Upgrade function, which for example could be realized with object oriented programming, such as C++, is used by the method of the present invention. The System Upgrade function is closer described in U.S. application Ser. No. 07/907,294, entitled "System for changing software during computer operation", to Telefonaktiebolaget L M Ericsson, hereby incorporated as reference. On top of the operating system is the application software, which in this example is divided in two parts, namely a part common to all software applications (APP), such as #7 signalling which is a standard used for communication in telecommunications systems, and the specific software for each application, such as ISDN, POTS, GSM, VLL etc.

The software that is most frequently replaced or upgraded, for example in the above mentioned telecommunication system, is the application software, such as ISDN, GSM etc. In context of the present invention it shall be understood that a software replacement or upgrading could be anything from replacing the whole application software to a small portion thereof.

With the method according to the present invention a new version of software will co-exist with the old version during upgrading. In this way it is possible to test new software with test traffic, while the normal traffic runs on the old version of software. If a fault occurs which can be associated with the new software, the upgrade will be reversed and the new software will be removed. Reversion during system upgrade is initiated by internally detected anomalies within the system upgrade software. Fault management can force a reversion and the maintenance engineer is also given the possibility to break an upgrade and thereby reversion.

Figure 3:
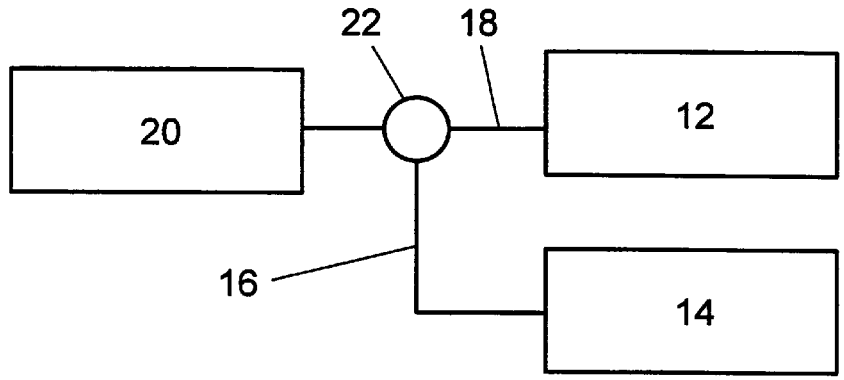
FIG. 3 shows a block diagram illustrating an exemplary procedure for redirecting processing from an old software unit to a new software unit.

As mentioned above it is typical to replace only part of the software at a time. The software to be replaced is referred to as a change unit. In FIG. 3 there is shown an unchanged software unit 20 coupled through an addressing mechanism 22, called a direction point, to an old change unit 12 and a new change unit 14. Unchanged interfaces 16 and 18 link the old change unit 12 and the new change unit 14 to the addressing mechanism 22. FIG. 3 illustrates the case in which there is a change unit in both the old software version, i.e. there is an old change unit 12, and in the new version of software, i.e. there is a new change unit 14. The new change unit 14 is by definition chosen to have an interface 16 that is compatible with the existing interface 18 to the unchanged software 20. This means that the unchanged software is able to cooperate with both the old and the new software version (change unit).

This aspect of the present invention, i.e., providing for the dynamic direction or re-direction of transactions, is facilitated by the introduction and use of direction points. These direction points consist of the places in the distributed system at which transactions may be directed in a particular way. The addressing mechanism 22 as illustrated in FIG. 3 represents the implementation of the direction points and the means by which the system's transactions are individually directed to either the new or old software version. These direction points are capable of operating in three different ways. First, they may be triggered by analysing the function name associated with the traffic being processed by the system. According to this method of operation, traffic can be directed to either a new or old software version of the particular function required to perform the necessary processing. Second, transactions can be directed to execute a new or old software version of a program based upon information supplied as a result of runtime linking of the software.

Figure 4:
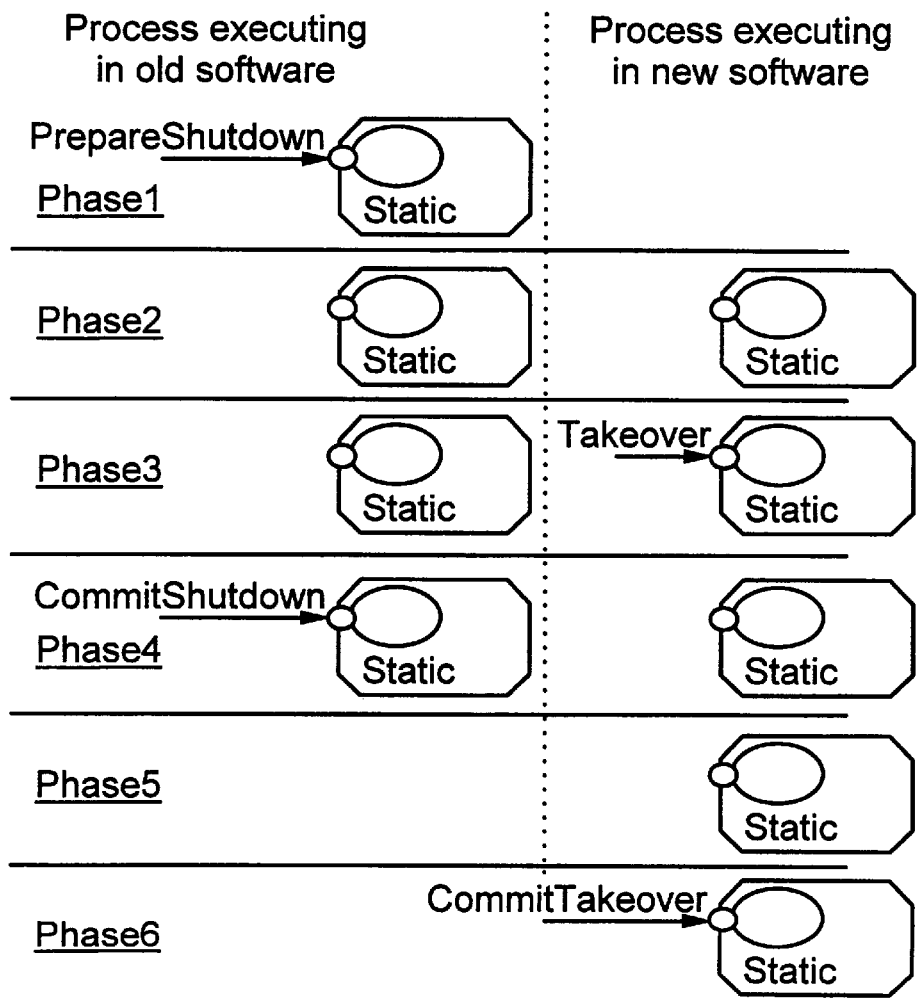
FIG. 4 shows the synchronization during system upgrade without reversion according to the present invention.
Figure 5:
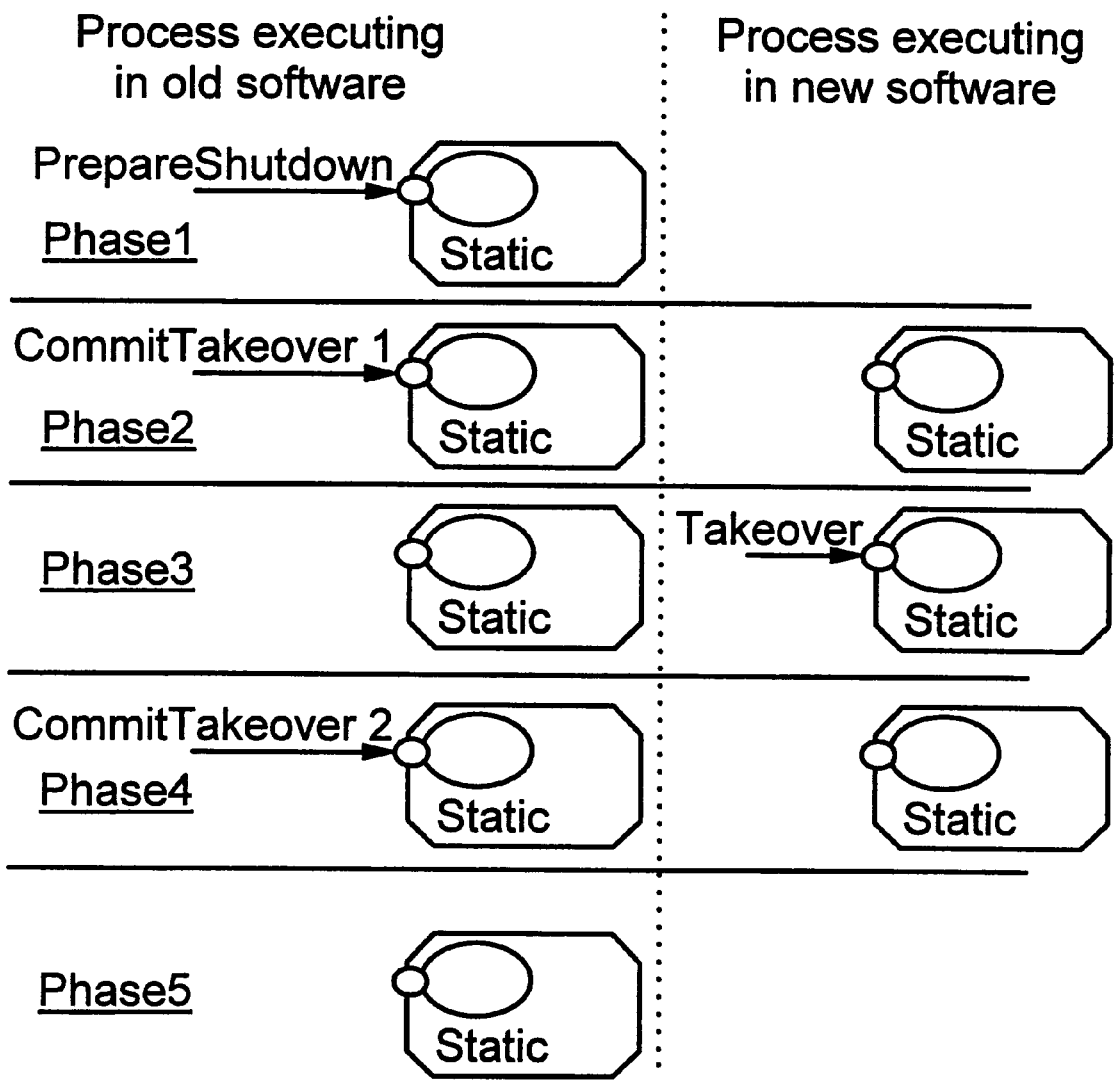
FIG. 5 shows the synchronization during system upgrade with reversion according to the present invention.

Two different cases of synchronisation will now be described, one without reversion, which implies a successful upgrade and one when reversion is initiated during the system upgrade. The first case without reversion is shown in FIG. 4 and the second case with reversion is shown in FIG. 5. In the figures a process is symbolically shown by a rectangle having cut away corners. A resource may own one or more resource objects. Examples of resource object are time slots, voice prompting equipment, etc.

FIG. 4 shows the different phases of and the synchronization during a system upgrade without reversion when an old version of software is replaced by a new version of software.

During phase 1 the old static processes within the old software are called with a PrepareShutdown signal before the new software is loaded and new static processes are started. The static process within the old software will by means of that signal be aware of its forthcoming termination and removal and prepares for the transfer of states. The old static process publishes or activates an application defined interface for transferring the state of resource objects. With publication is meant defining the way the process communicates with other processes. This interface may later be called by the static process within the new version of software, for allocating resource objects. The old static process may also inform neighbouring processes, for example a distributor process, about a forthcoming termination so that routing can be done towards redundant alternatives, according to the above mentioned U.S. application Ser. No. 07/907,294. During phase 1 all traffic will be handled as usual by the old version of software. This first phase comes to an end when the new software has been loaded.

In phase 2 the static processes within the new software are started in a state different from initial start. Instead the static processes have to be started in a way that indicates that there will be a transfer of states between the old and new static processes within the old respectively the new version of software. During this phase the new static process receives test traffic and subsequently normal (live) traffic, if the execution of test traffic proceeds without any disturbances. The synchronization of state transfer during test traffic will be described in greater detail in conjunction with FIG. 6, which describes state transfer during system upgrade. During this second phase normal traffic will first be handled by the old version of software, simultaneously with the test traffic handled by the new version of software. Thereafter all "new" traffic initiated after the test traffic has come to an end will be handled by the new software. The "old" traffic, i.e. the normal traffic prior to the ending of the test traffic, will be handled by the old version of software until it terminates.

Since this example describes the system upgrade without reversion the test traffic and also the normal traffic executed thereafter proceeds without any disturbances. Therefore, in phase 3 the static processes within the new software are ordered to claim all resource objects of the static processes within the old software with a Takeover signal. This is the first operation introduced by the System Upgrade function on static processes declared in the new software. The application defined interface published or activated for state transfer is called by this new static process for transferring the control of resource objects and taking over all resource objects. During this third phase almost all traffic will be handled by the new software, except for the remaining old traffic handled by the old software.

In phase 4 the old processes are ordered to remove all services, i.e. there are no more resource objects available to the old processes, with a CommitShutdown signal. There are two different criteria which could be used regarding the time when this CommitShutdown signal should be applied to the old processes. Firstly, this signal can be applied to the old processes when all of the old traffic handled by the old software has terminated. This ensures that no ongoing traffic will be disturbed during system upgrade, since the services of the old software will, be removed until there is no more traffic to handle. Secondly, this signal can be applied to the old processes after a certain time has elapsed starting from the time when system upgrade is initiated. This will often give a much faster upgrading procedure, but also a risk of losing some traffic (calls). When the services have been removed the interface used for transfer of resource objects is withdrawn. After the CommitShutdown signal has been given all traffic will be handled by the new version of software.

Thereafter, in phase 5, the old software is blocked and removed and in phase 6 the new process now is the sole owner of the resource objects previously claimed from the old process. This is indicated by the CommitTakeover signal to the new process. This signal is sent when the System upgrade function is committed and the static process will survive the upgrade.

FIG. 5 shows the different phases of and the synchronization during a system upgrade with reversion when an old version of software is replaced by a new version of software. The main difference of this case compared with that of FIG. 4 is the receiver of the CommitTakeover signal. In this case the static process executing in old software is the receiver and the owner of the resource objects. Reversion could be initiated either by the operation and maintenance technician or be carried out automatically.

The reversion during system upgrade can be carried out at any time prior to the CommitShutdown signal, which is applied to the old static process as described above in conjunction with FIG. 4. Depending on in which phase the upgrading procedure is reversed the result will differ. Referring to FIG. 5, two different cases of reversion will be described.

In the first case, shown with an arrow CommitTakeover 1, reversion is carried out in phase 2, i.e. before the new static process receives the Takeover signal. During phase 2 first test traffic and then normal traffic will be handled by the new static processes. If, during the test traffic period, problems will arise due to the new software reversion will be initiated by applying the CommitTakeover signal to the old static processes, either automatically or by the upgrading engineer. Since the old static processes at this instance still are the owners of all resource objects no states of the old static processes will be lost due to reversion. The only thing that will happen is that the test traffic will be halted. The time during test traffic is the most common and also the most suitable to carry out reversion, since the users not in any way are affected by it. Reversion can also take place somewhat later in phase 2, i.e. at the time when the new software starts to execute normal traffic. If reversion is carried out during this time, still no states of the old static processes will be lost due to reversion. If there are severe problems with the new software there could be a problem in executing the ongoing normal traffic, but the new software will try to handle the normal traffic until it terminates. All normal traffic beginning after reversion, i.e. after the signal CommitTakeover has been applied to the old static processes, will be handled by the old software.

In the second case, shown with an arrow CommitTakeover 2, reversion will be carried out after the signal Takeover has been applied to the new static processes, i.e. in phase 4. After the Takeover signal the new software, as described above, has taken control over all resource objects. A reversion, by applying the signal CommitTakeover to the old static processes, is possible but the states in the new static processes that have been changed during the time between the Takeover signal and the CommitTakeover signal will be lost.

Reversion could also be done after the signal CommitShutdown has been applied to the old static processes, but all states will be lost, since the old software has to be initially started.

Figure 6:
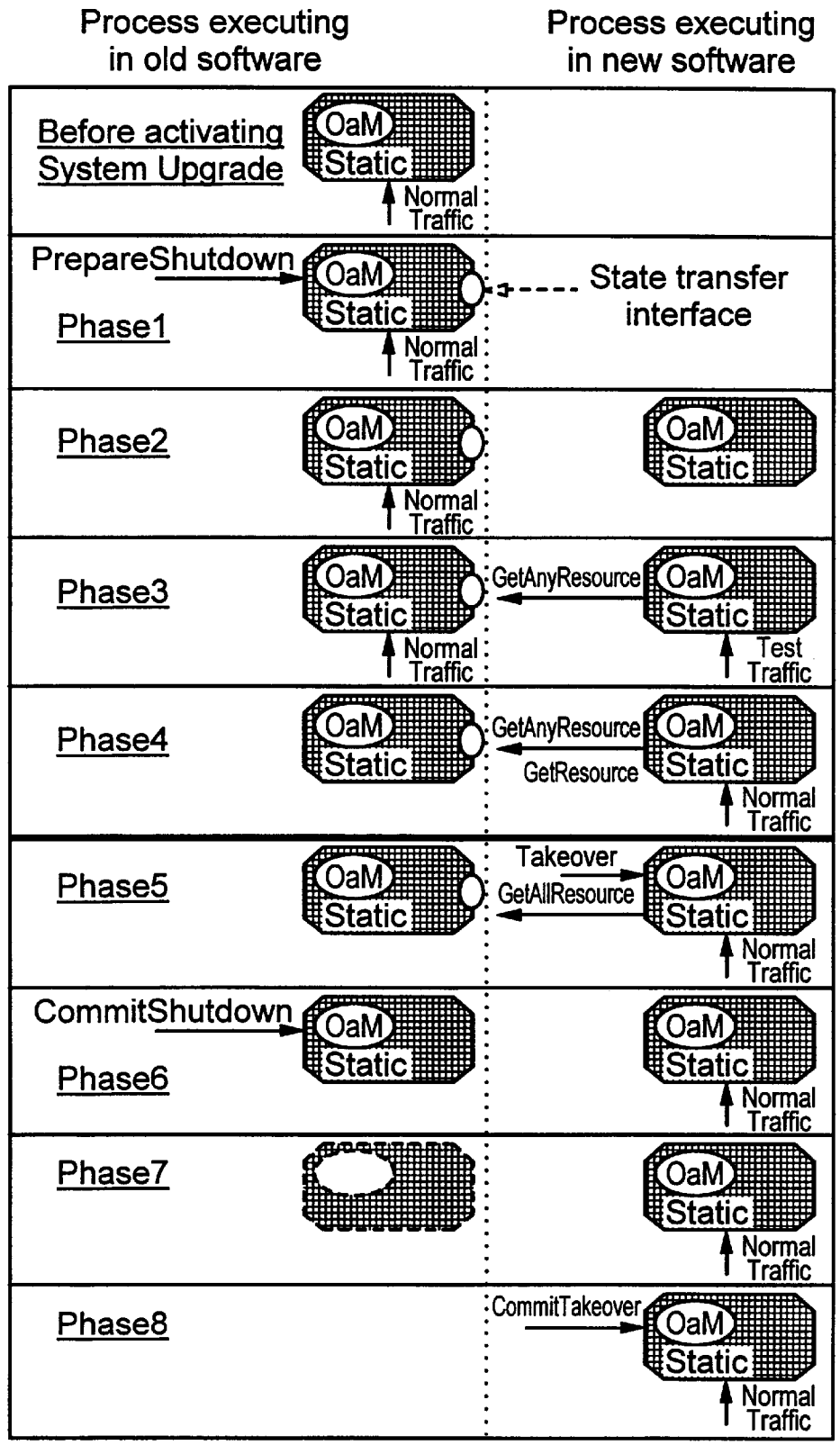
FIG. 6 shows the synchronization and state transfer during system upgrade.

Referring to FIG. 6, the synchronization of state transfer during system upgrade will be described. The state transfer interface, which is activated or published during phase 1 described above, must be specified by the application to make it possible for the new static processes to coordinate and transfer the control of resource objects from the old processes. In FIG. 6 and the description below the following generic operations within that interface will be used.

GetResource, which operation transfers the control of a specific resource object from an old static process to a new. This operation is called when the new static process needs a specific resource object in control of the old static process.

GetAnyResource, which operation transfers the control of a any resource object from an old static process to a new. This operation is called when the new static process needs any resource object in control of the old static process.

GetAllResources, which operation transfers the control of state information for all the remaining resource objects in the old static processes to the new static processes. This operation can only be carried out after that the new static processes have received the signal Takeover.

The synchronization and state transfer during system upgrade will now be described closer in conjunction with FIG. 6, in which the upgrading procedure is divided in 8 phases.

Before the upgrading procedure starts traffic will run as normal on the old software. In phase 1 the old static process is informed about the forthcoming termination due to system upgrade with the operation PrepareShutdown, after which the application activates or publishes the interface for state transfer making the following system upgrade possible, as previously described. Then in phase 2 the static process for the application within the new software is started. The port name activated or published in this phase is the same as for the old software.

Thereafter the new software is ready to receive test traffic in phase 3. The test traffic can either be computer generated or be "live" traffic preformed by the operation and maintenance engineer. During the test traffic period the new software will need resource objects owned by the static processes of the old version of software. The new static processes get the necessary resource objects from the old static processes with the operation GetAnyResource through the interface for state transfer. Even if the new static processes have access to the resource objects they are still owned by the old static processes.

If the test traffic period proceeds without any disturbances the new static processes will be called with normal traffic, phase 4, and get necessary resource objects from the old static processes by either the operation GetResource or GetAnyResource through the interface for state transfer. During this period when new traffic is being handled by the new software the state of the resource objects that have been claimed by the new static processes, but still are owned by the old static processes, could change. This change is transferred back to the old static processes, since they are the owners of the resource objects. If this is not done this updated state information would be lost if a reversion becomes necessary. After this phase reversion without the risk of losing state information is not longer possible.

In phase 5 the new static processes are called with the System Upgrade function TakeOver, which in turn activates the operation GetAllResources. The new static processes will now have the control of all the resource objects from the old static processes. In phase 6 the old static processes are called with the operation CommitShutdown and the application removes the interface activated or published in phase 1. Thereafter, in phase 7, the old static processes will be terminated by the System Upgrade function. In the last phase 8 the new static processes are informed by System Upgrade that the new software are committed. Process dependent on old software system parts will be terminated.

Below a practical example where the smooth system upgrade method is applied on a resource server will be described in conjunction with FIGS. 7a–7n. A resource server is a static process which controls allocation and deallocations of pool resources. Pool resources are those resource objects which are mutually equivalent, i.e all resource objects within a pool are interchangeable, for example DTMF-receivers, channels in a route or echo cancellers. In FIG. 7 an R will designate an object representing a pool resource. If the resource is idle it has a light background, as in the left hand side of FIG. 7a, if the resource is allocated it is shaded, as in the right hand side of FIG. 7a and a resource not in control of the resource server is drawn with dashed lines as in the right hand part of FIG. 7c.

Figure 7A:
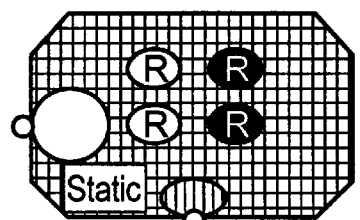
FIGS. 7a–7n shows a practical example in which the smooth system upgrade method is applied on a resource server.

Before activating System Upgrade allocating and deallocating resources is performed in the normal way, FIG. 7a. If a requested resource is impossible to allocate the requesting process is informed about the lack of resources. This behaviour is unchanged even if there is an ongoing System Upgrade and the allocation is done through the interface for state transfer.

The smooth System Upgrade method applied on the resource server will be described in correspondence to the 8 phases described in conjunction with FIG. 6.

Figure 7B:
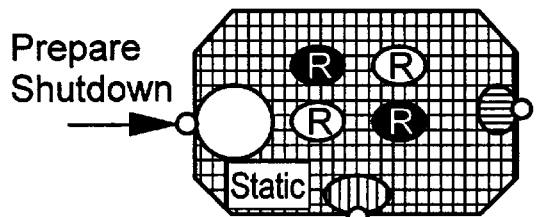
Figure 7C:
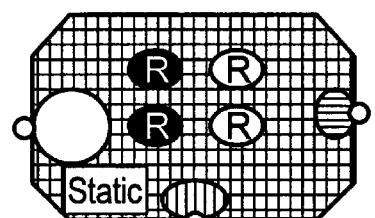
Figure 7C:
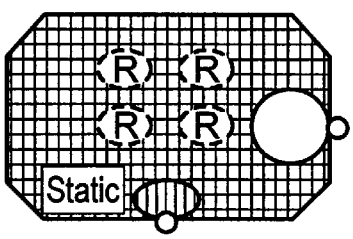

As shown in FIG. 7b the application is informed about a termination due to System Upgrade. The resource server publishes the interface for state transfer after receiving the signal PrepareShutdown, as described above. Thereafter, as shown in FIG. 7c, a new resource server is started in phase 2. The resources in the new resource server are as shown in FIG. 7c resources not in control by the resource server. The old resource server still executes calls for allocating and deallocating resources as usual.

Figure 7D:
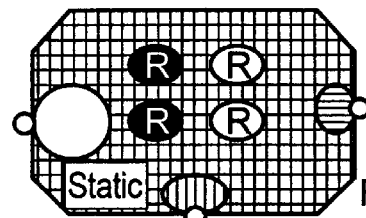
Figure 7D:
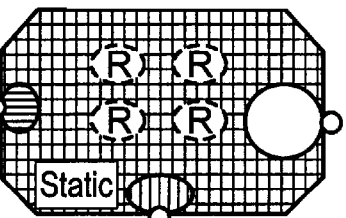
Figure 7E:
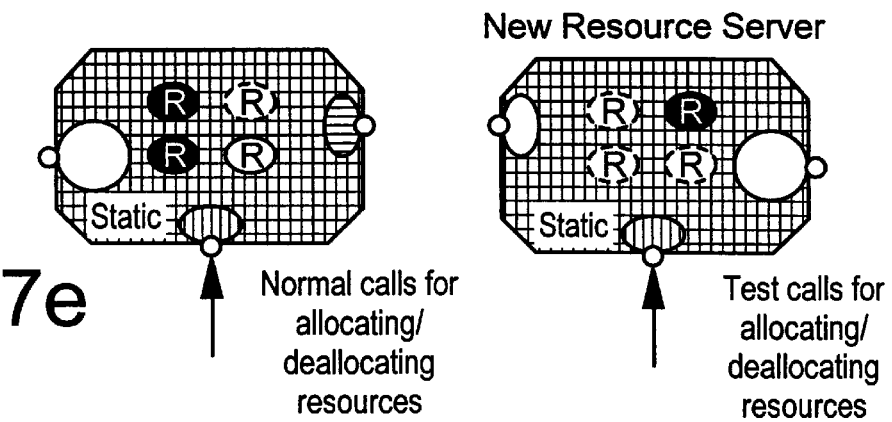

In phase 3, test traffic is routed against the new resource server, while normal traffic is routed against the old resource server, as shown in FIG. 7d. The control of a resource needed by the new resource server is fetched via the interface for state transfer by the operation GetResource. As shown in FIG. 7e, the resources requested by the test traffic in FIG. 7d are allocated in the new resource server.

Figure 7F:
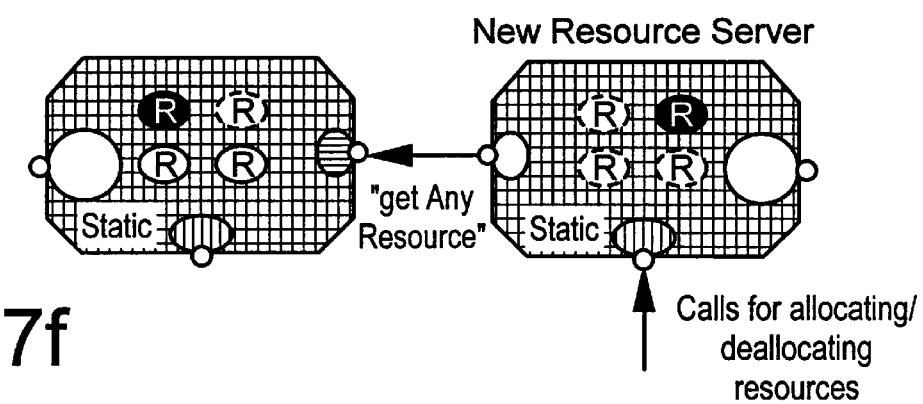
Figure 7G:
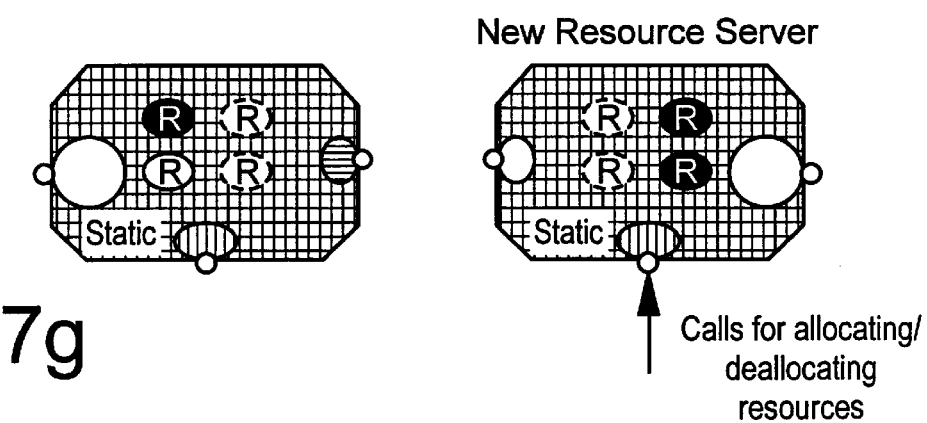
Figure 7H:
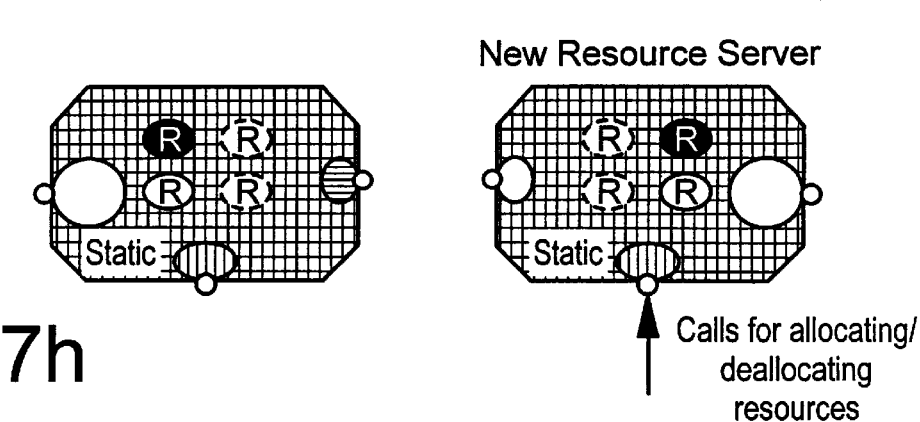
Figure 7I:
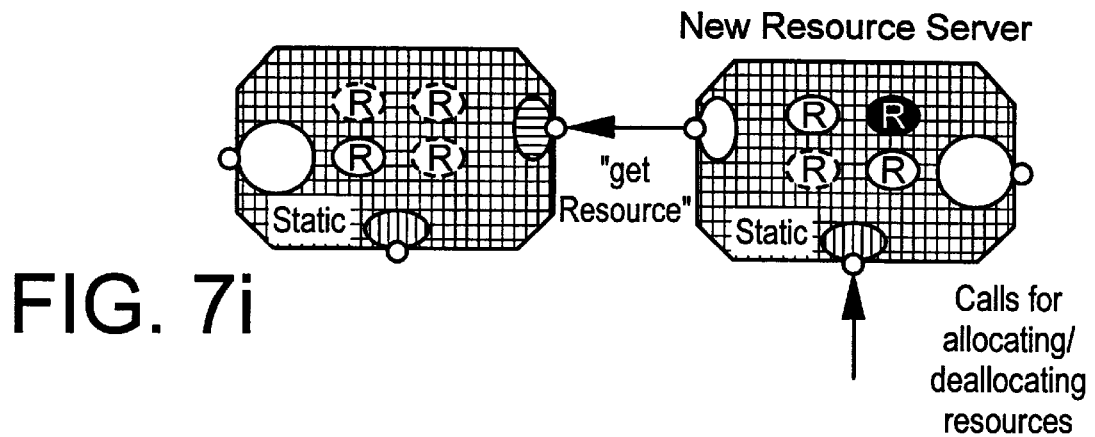

After the test traffic has successfully been handled by the new resource server normal traffic will be directed against the new resource server in phase 4, shown i FIG. 7f. The control of a resource is fetched when needed via the interface for state transfer with the operation GetAnyResource. There are two possibilities in phase 4. The resource is allocated and deallocated from the new resource server, shown in FIGS. 7g and 7h. The resource in the lower right corner is allocated in FIG. 7g and returned in FIG. 7h. The other case is if the resource is allocated earlier in phase 3 with the old resource server and then deallocated in the new resource server. In this case the new resource server requests control of this specific resource through the interface for state transfer with the operation GetResource, which is shown i FIG. 7i. The resource in the upper left corner is reserved in phase 1, FIG. 7b, in the old resource server and returned to the new resource server in phase 4. The control of the resource is requested via the interface for state transfer with the operation GetResource.

Figure 7J:
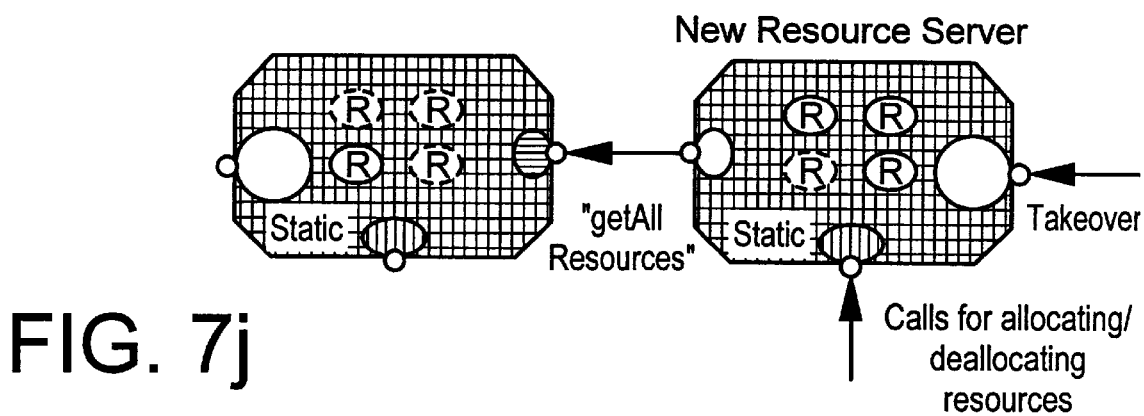
Figure 7K:
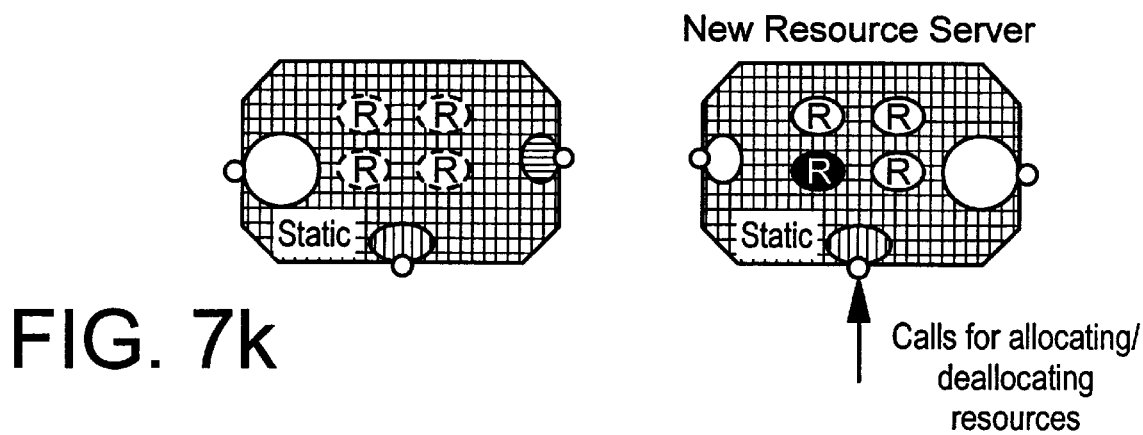

In phase 5, FIGS. 7*j* and 7*k*, the control of all remaining resources are fetched via the interface for state transfer. The new resource server is called by the System Upgrade function with the operation Takeover and the remaining resources are fetched via the interface for state transfer with the operation GetAllResources, FIG. 7*j*. After the GetAllResources operation the new resource server is in control of all the resources, which is shown in FIG. 7*k* with the transfer of the resource in the lower left corner to the new resource server.

Figure 7L:
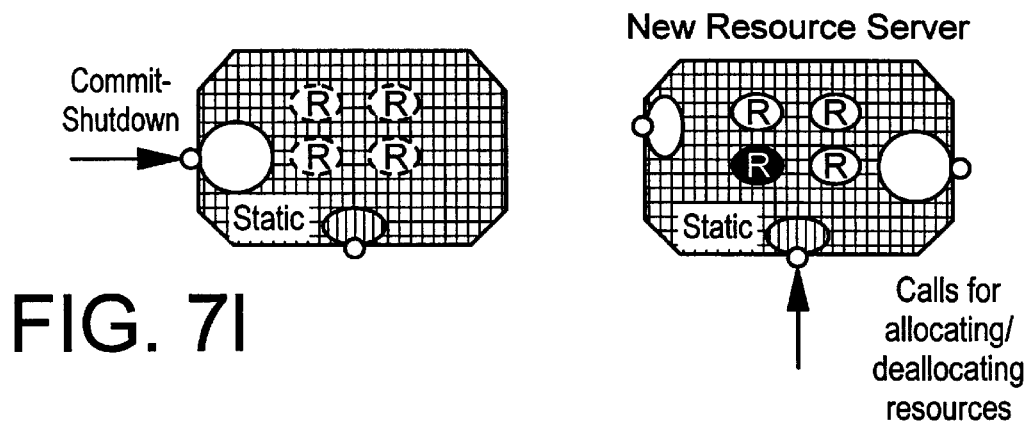
Figure 7M:
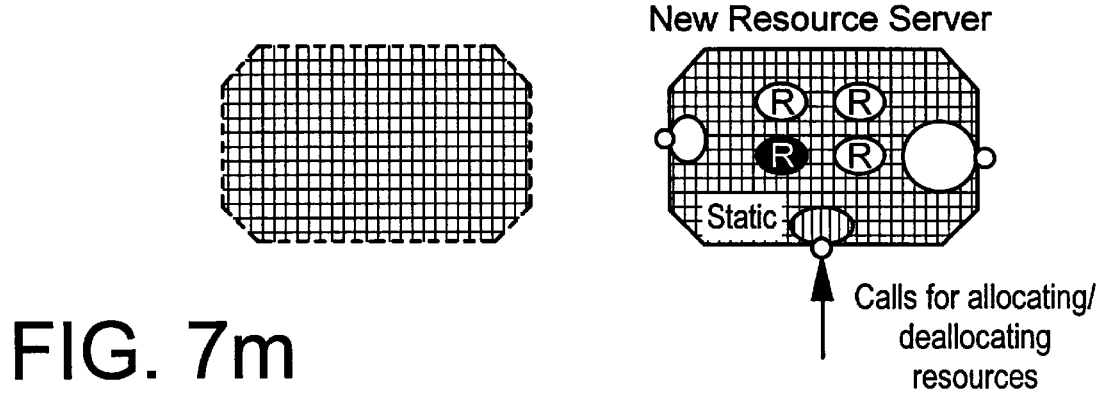
Figure 7N:
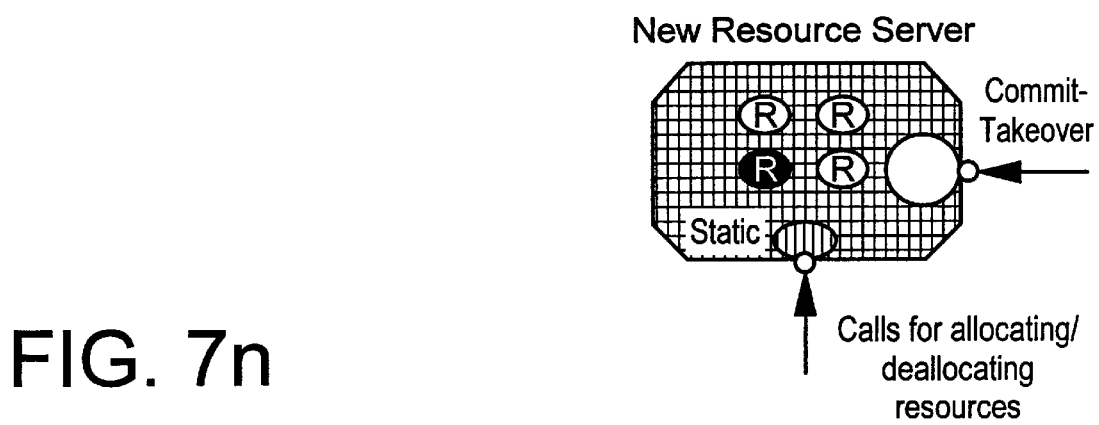

In phase 6, shown in FIG. 7*l*, the old resource server is called from System Upgrade with the operation CommitShutdown, as previously described in conjunction with FIG. 6. In phase 7, shown in FIG. 7*m*, the old resource server is terminated by the System Upgrade function. In the final phase 8 the dynamic process dependent on the old software system parts are terminated by the System Upgrade function CommitTakeover.

It is thus believed that the method of the present invention will be apparent from the foregoing description. While the method shown and described has been characterized as being preferred, it will be readily apparent that various changes and modifications can be made therein without departing from the spirit and the scope of the invention as defined in the following claims.

What is claimed is:

1. Method of synchronizing state transfer of resource objects from an old static process declared in an old software version to a new static process declared in a new software version during the replacement of the old with the new version of software and without disturbing the ongoing activities, comprising the steps of preparing the old static process within the old software for a forthcoming shutdown, activating it for the state transfer, preparing the new static process within the new software to take over, transferring all resource objects in the old static process to the new static process, ordering the old static process to remove all services, terminating the old static process, and committing the new static process to take over, indicating that the new static process is the sole owner of all the resource objects previously claimed from the old static process.

2. Method of synchronization according to claim 1, wherein the step of preparing the old static process for shutdown comprises activating an interface for state transfer.

3. Method of synchronization according to claim 2, wherein the step of preparing the new static process to take over comprises allocation and deallocation, through the interface for state transfer, of certain resource objects in the old static process needed by the new static process during a period when the new static process receives test data.

4. Method of synchronization according to claim 3, wherein in response to a successful processing of test data by the new software all resource objects are transferred from the old to the new static process.

5. Method of synchronization according to claim 3, wherein in response to an unsuccessful processing of test data the new software is removed and the resource objects remain in control of the old software.

6. Method of synchronizing replacement of an old version of software with a new version of software in a telecommunications system, without disturbing ongoing activities, comprising the steps of preparing an old static process within the old software for a forthcoming shutdown, activating it for a state transfer, loading the new software into said telecommunications system, while the old software processes normal traffic, testing the new software with test traffic in parallel with processing normal traffic on the old software, processing new normal traffic with the new software in parallel with processing old normal traffic with the old software, preparing a new static process within the new software to take over, transferring all resource objects in the old static process to the new static process, ordering the old static process to remove all services, terminating the old static process, and committing the new static process to take over, indicating that the new static process is the sole owner of all resource objects previously claimed from the old static process.

7. The method according to claim 6, wherein the step of preparing the old static process for shutdown comprises activating an interface for state transfer.

8. The method according to claim 6, wherein the step of testing the new software comprises allocation and deallocation, through the interface for state transfer, of certain resource objects in the old static process needed by the new static process during the period of test traffic.

9. Method according to claim 8, wherein in response to a successful processing of test traffic by the new software all resource objects are transferred from the old to the new static process.

10. Method according to claim 8, wherein in response to an unsuccessful processing of test data the new software is removed and the resource objects remain in control of the old software.

* * * * *